Jan. 24, 1928.
E. S. PORTER
SLIDE CARRIER
Filed June 21, 1924
1,657,034
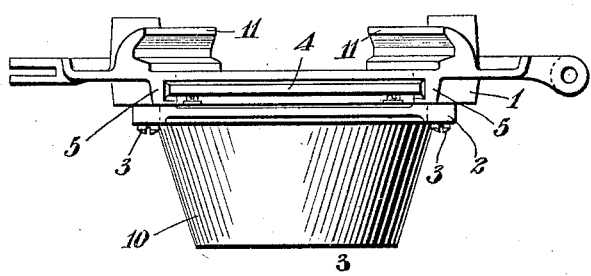
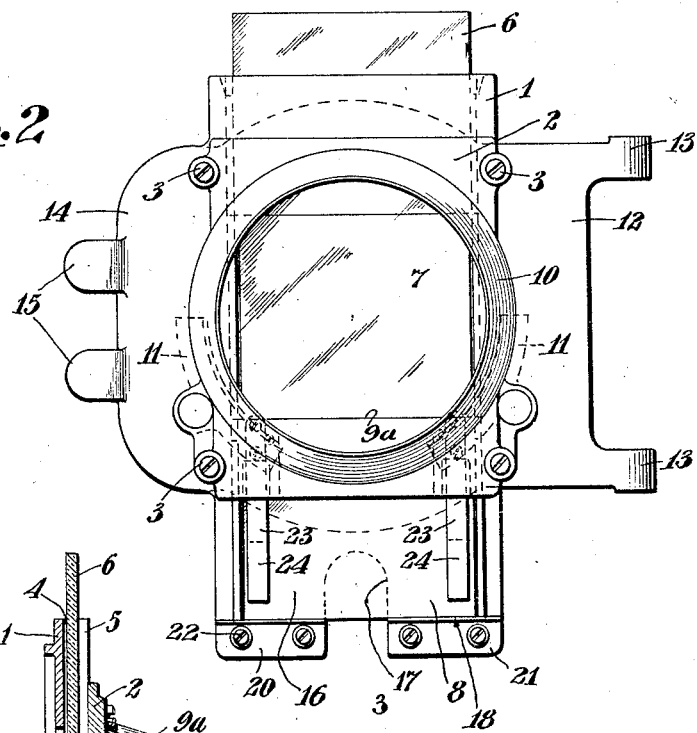
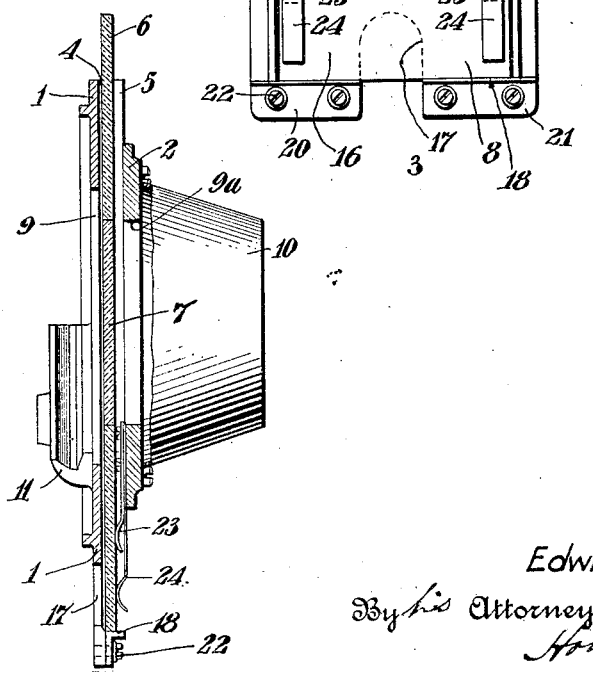
Inventor
Edwin S. Porter.
By his Attorney
Howard W. Dix Patented Jan. 24, 1928.

1,657,034

UNITED STATES PATENT OFFICE.

EDWIN S. PORTER, OF NEW YORK, N. Y., ASSIGNOR TO THE PRECISION MACHINE CO. INC., OF NEW YORK, N. Y., A CORPORATION OF NEW YORK.

SLIDE CARRIER.

Application filed June 21, 1924. Serial No. 721,384.

This invention relates to a novel and improved holder or carrier for supporting and guiding picture slides and announcement plates as they are passed before the light of a stereopticon lantern or before the light of a motion picture projecting machine.

In particular, my invention pertains to special features of a slide holder that insure safer operation, greater convenience in operation, and generally to improve devices of this nature.

While I have herein disclosed and described the several features of my improved carrier as being incorporated in a carrier constructed or enlarged to include means to hold condenser lenses and means for holding the carrier to the projection machine lamp house, it is to be understood that these features may be incorporated in any slide holder or carrier that may be mounted in any desired position with reference to a projection lamp.

The main object of my invention is to provide an improved holder, or carrier for slides or announcement plates and to so construct the carrier that it is capable of being mounted in a position not to interfere with other operations of the projecting machine, and further to provide a carrier that permits convenient operation of changing slides when the operator is standing on either side of the machine.

Another and important object of my invention is to provide an efficient slide carrier that permits the changing of slides in a manner that makes the change unnoticeable to the audience and still not cause damage to the slides by sudden and complete stopping after the slides have been set in motion and to accomplish this last named operation without scratching or marring the slides.

A particular object of this invention is to provide a design of slide carrier that may be "built in" or incorporated in a particular part of the lamp house of a motion picture machine and to have embodied therein all of the advantageous features of my invention.

Other objects and advantages of this invention will be appreciated as the detailed description set forth below is read.

Heretofore it has been usual to provide stereopticon lanterns and motion picture projecting machines with slide carriers which operate horizontally. Each of such carriers is constructed to receive two slides and is moved back and forth so that one slide is in front of the projecting lamp while the slide which has been projected is being replaced by a new slide. Slide carriers of this construction extend beyond the sides of the lamp house of these machines and thus interfere with other operations of the machine.

Other types of slide carriers have been devised and affixed to the machines with the sole purpose in mind of eliminating the interference of the carriers with the operation of the machines. These improved carriers arrange for a vertical movement of the slides instead of a horizontal movement. Constructions of this nature are shown in the Muybridge Patent 251,127 and Schwanhausser Patent 1,233,407. The constructions disclosed in both of these patents have the disadvantage of allowing two slides to drop and then be brought to a sudden stop after the lowermost slide has been removed. This operation is detrimental to the slides as this rough usage breaks and cracks them. The Schwanhausser device, however, provides a spring near the base of the carrier for positively engaging the slides as they pass to the bottom of the carrier for the specific purpose of reducing the speed of movement. The lower part of Schwanhausser's carrier is enclosed and therefore this spring does not act as a guide. Such a positive engagement of the face of the slide, it has been found, scratches and mars the slide and does not satisfactorily reduce the speed.

My novel device is an improvement on the constructions herein noted and operates in such a satisfactory manner as to eliminate the above noted disadvantages. It has been found that my improved slide carrier is advantageous in its operation for it permits the operator to change the slides from either side of the machine, and gives the best possible results when the machine is materially tilted as is usually the case when the machine or lantern is positioned near the roof of a theatre or hall.

The preferred embodiment of my invention is herein illustrated in the accompanying drawings as being provided with lens carrying attachment and means for affixing the carrier to the lamp house of a motion picture projecting machine, and as thus constructed, Fig. 1 is a top plan view of my improved slide carrier;

Fig. 2 is a front view of the carrier showing 3 slides in position; and

Fig. 3 is a sectional view taken on the line 3—3 of Fig. 2.

Referring now to the drawings I prefer to construct my improved carrier by providing a back plate 1 and a front plate 2 which may be readily assembled on the back plate by any suitable means such as screws 3. In the back plate I preferably provide a channel 4 by forming flanges 5. The formation of the back plate is of sufficient length to accommodate three slides 6, 7 and 8 as clearly illustrated in Figs. 2 and 3. This construction permits the middle plate 7 to register with a suitable opening 9 in the back plate and 9$^a$ in the front plate and to be in the path of light rays of a lantern thereby causing the projection of the slide onto a screen.

The front plate 2 carries a shield 10 for the light and the back plate 1 is provided with projecting pieces 11 which receive and hold condenser lenses. The back plate is usually constructed in a manner which permits the carrier to be suitably mounted on the lamp house of a motion picture projecting machine or a stereopticon lantern, and I have herein shown the back plate as provided with an extension 12 having ears 13 for pivotally mounting the carrier on the lamp house. The carrier is also provided with extension 14 having flanges 15 which engage a binding arm to hold the carrier and lenses in proper position on the lamp house.

The carrier is constructed so that it is provided with or by reason of its particular construction forms an opening 16 in its front side near the base thereof. This opening permits the removal of the lowermost slide, and it is preferred that the height of this opening be less than the height of one of the slides. Thus a certain portion of my improved carrier, i. e., the lower part of the front plate, performs the function of maintaining the lowermost plate in position while one slide is being projected. The channel formation in the back plate is such that the lower end thereof is closed except for a suitable opening 17 which extends part way up the back plate from the base thereof. This opening is known as the finger opening and permits an operator to grasp the lowermost slide or plate and remove the same from the carrier. This opening may be made at any desired position but I prefer to have the same made in the middle of the base and back plate so that it will be convenient for the operator to remove the lowermost slide from either side of the machine. The same advantage of operation may be obtained by cutting away the corners at the bottom of back plate 2 to allow the thumb and forefinger to grasp either bottom corner of the lowermost plate and remove the same from the carrier.

At the base of the carrier I prefer to provide a suitable platform 18 for supporting the slides in their vertical positions one above another and have so positioned this platform that it lies in a vertical plane which passes through the longer axes of the slides. While I have shown this platform as a separate member attached to back plate 1 it is to be understood that such a platform may be provided by forming a flange on the bottom or base of back plate 1. Also this platform may be made of any suitable material and if desired the material may be somewhat resilient in order to absorb some of the shocks of the slides as they drop onto the platform but not to have sufficient springiness to cause the slides to rebound to such an extent as will be noticeable on the screen. By providing the opening 17 the platform is divided into two sections 20 and 21. The base of the carrier heretofore referred to is the lower portion or bottom of the slide carrier, and this portion preferably comprises the platform 18 formed by the sections 20 and 21 thereof and that part of plate 1 to which the platform sections are attached. It is to be understood, however, as noted above, that the platform 18 and the bottom end of plate 1 may be formed integrally thereby forming a unit base.

From the foregoing description it will be seen that the slides are vertically held in the carrier and that both edges of each slide are guided from the top to the bottom of the carrier as the side edges of the channel are preferably closed from top to base, also that a suitable platform is provided at the base of the carrier for supporting the slides in proper vertical position and that this platform is normally immovable from the carrier, although in case of repairs this preferred form of platform may be removed by removing screws 22. While I have also herein described a specific form and construction of a carrier it will be noted that the most essentials are, a suitable channel for receiving the slides in vertical relation to one another, guides for the sides of the slides and a suitable platform for supporting the slides in their normal position and an advantageous opening in the front side of the carrier to permit the lowermost slide to be removed. In addition I have provided a proper opening so that the slides may be readily grasped to be removed.

Thus it is my intention to provide and claim a suitable slide carrier which has the above features which combine to make my improved slide carrier more easily and safely operated. The preferred construction illustrated holds and guides three slides but it is to be understood that it may be constructed to carry a larger number of slides.

In removing the lowermost slide so that a change may be made from one slide to another, the operator grasps the slide by placing his finger in finger opening 17 and in engagement with the back of the slide and by placing his thumb on the front of the slide. With this grasp he oscillates the bottom of the slide to remove the same from platform 18 and then he draws the slide downwardly from the carrier. In so doing the top edge of the slide is maintained in the vertical plane of the slides until this edge arrives at a position near said platform when the slide is drawn clear of the carrier. For purposes of convenience and in order to make sure that the slides will not drop from the carrier I provide a suitable guide means to engage the front of the slide at some definite position so that the bottom edge of the slide dropping will be guided onto platform 18. A preferred guiding means is illustrated in the form of springs 23 which are usually carried by front plate 2 and are shown as engaging the slide near the edges thereof. If desired, the slides may be further placed to the edges of the channel so that they will engage only a small portion of the slide. When desirable, a further resilient guide means in the form of springs 24 may be provided to engage the slide at a point near its bottom edge. These resilient guides 24 operate somewhat to hold the top edge of the slide being removed in the vertical plane of the slides. When the machine or lantern in operation is tilted considerably the spring members 23 positively guide the slides so that the bottom edge of the dropping slide will engage the platform 18. However, when the machine is not tilted to resilient guide means 23 and 24 do not perform any particular useful functions unless it is to maintain the top edge of a slide being removed in the vertical plane of the remaining slides.

In this preferred construction of carrier whereby the slide is removed from the front side of the carrier, it will be noted that the dropping of slides 6 and 7 will be completed in a manner which prevents a rebounding of the slides and in doing so it materially reduces their speeds of movement which has heretofore been the main cause of breaking and cracking of the slides. This is accomplished for the reason that the top edge of the lowermost slide remains in contact with the bottom edge of slide 7 until slide 7 is nearly into its normal position in the bottom of the slide carrier for an engagement with platform 18. With slight practice it will be seen that the lowermost slide may be removed at a speed which permits slide 6 to be brought into projecting position in front of openings 9 and 9ª without the audience appreciating the change and without having the slide 7 moving at its maximum speed just before it engages platform 18.

It will be seen from the above description that my improved slide carrier has many advantages. Particularly my improved carrier is constructed to permit operation from either side of the machine and is so constructed as to carry other accessories such as condenser lenses, and thus I eliminate having a separate carrier for a motion picture projecting machine as has heretofore been the method of assembly. However, I wish it to be understood that the essential features of my invention may be incorporated in a slide holder which may be separately attached to a lantern or projecting machine.

It will be understood that while I have here described in detail a particular embodiment of my invention for purposes of full disclosures, and some detailed features which I am specifically claiming for a special advantage, many changes and modifications may be made in the particular construction and arrangement of parts without departing from the broad scope of my invention which is outlined in the sub-joined claims.

What I claim is:—

1. A slide carrier constructed to support a plurality of slides vertically positioned one above another, said carrier comprising a front plate, a back plate spaced apart from said front plate to form a channel for the slides, and guides for the side edges of the slides, said plates being provided with openings which register to permit projection of the slides, said back plate having a platform at its base for supporting the slides, said front plate being of less length than the back plate to thereby provide at the base of the carrier a front opening through which the lowermost slide may be withdrawn by moving the bottom edge thereof outward from the back plate and then pulling the slide downward.

2. A slide carrier constructed to support a plurality of slides vertically positioned one above another, said carrier comprising a front plate, a back plate spaced apart from said front plate to form a channel for the slides, and guides extending from the top of the back plate to the platform at the base thereof, said plates being provided with openings which register to permit projection of the slides, said back plate having a platform at its base for supporting the slides, said front plate being of less length than the back plate to thereby provide at the base of the carrier a front opening through which the lowermost slide may be withdrawn.

3. A slide carrier constructed to support a plurality of slides vertically positioned one above another, said carrier comprising a front plate, a back plate spaced apart from said front plate to form a channel for the slides, and guides for the side edges of the slides, said plates being provided with openings which register to permit projection of the slides, said back plate having a platform at its base for supporting the slides, said front plate being of less length than the back plate to thereby provide at the base of the carrier a front opening through which the lowermost slide may be withdrawn, said front opening being of less height than the height of one of the slides.

4. A slide carrier constructed to support a plurality of slides vertically positioned one above another, said carrier comprising a front plate, a back plate spaced apart from said front plate to form a channel for the slides, and guides for the side edges of the slides, said plates being provided with openings which register to permit projection of the slides, said back plate having a platform at its base for supporting the slides, and having an opening formed in said back plate for permitting an operator's fingers to grasp the lowermost slide and move the same from the platform, said front plate being of less length than the back plate to thereby provide at the base of the carrier a front opening through which the lowermost slide may be withdrawn.

5. A slide carrier constructed to support a plurality of slides vertically positioned one above another, said carrier comprising a front plate, a back plate spaced apart from said front plate to form a channel for the slides, and guides for the side edges of the slides, said plates being provided with openings which register to permit projection of the slides, said back plate having a platform at its base for supporting the slides, and having a finger opening midway between said guides for permitting the operator's fingers to grasp the lowermost slide, said front plate being of less length than the back plate to thereby provide at base of the carrier a front opening through which the lowermost slide may be withdrawn by moving the bottom edge thereof outward from said back plate and then pulling the slide downward.

6. A slide carrier constructed to support a plurality of slides vertically positioned one above another, said carrier comprising a front plate, a back plate spaced apart from said front plate to form a channel for the slides, guides for engaging the side edges of the slides, said plates being provided with openings which register to permit projection of the slides, said back plate having a platform at its base for supporting the slides, said front plate being of less length than the back plate to thereby provide at the base of the carrier a front opening of less height than the height of one of the slides, said opening adapted to permit the withdrawal outward of the lowermost slide, and a spring for holding the lowermost slide in position on said platform.

7. A slide carrier constructed to support a plurality of slides vertically positioned one above another, said carrier comprising a front plate, a back plate spaced apart from said front plate to form a channel for the slides, guides for engaging the side edges of the slides, said plates being provided with openings which register to permit projection of the slides, said back plate having a platform at its base for supporting the slides, said front plate being of less length than the back plate to thereby provide at the base of the carrier a front opening of less height than the height of one of the slides, said opening adapted to permit the withdrawal outward of the lowermost slide, and springs affixed to said front plate near the guides for engaging the lowermost slide to maintain the same on said platform, said springs adapted to be temporarily moved outward as said lowermost slide is removed from the carrier.

8. A slide carrier constructed to support a plurality of slides vertically one above another, said carrier having an opening to permit light rays to pass through one of said slides for projecting the same and having another opening in the front thereof near its base to permit the lowermost slide to be withdrawn, means at the base of said carrier for normally supporting said slides, and a guiding means associated with said carrier and extending into the said front opening for guiding a slide to normal supporting position on said supporting means during the removal of the lowermost slide.

9. A slide carrier constructed to hold and guide a plurality of slides vertically one above another, said carrier having an opening to permit light rays to pass through one of the slides for projecting the same and having another opening in the front thereof near the base to permit the lowermost slide to be withdrawn, a platform at the base of said carrier for supporting said slides, and a resilient guiding means for engaging the front surface of a slide for guiding the same on to said platform during the removal of the lowermost slide.

10. A slide carrier constructed to support and guide a plurality of slides vertically one above another, said carrier having an opening to permit light rays to pass through one of said slides for projecting the same and having another opening in the front thereof near its base to permit the lowermost slide to be withdrawn, said carrier being further provided with a third opening which is formed in the back thereof and which extends through the base, said opening permitting operator's fingers to grasp the lowermost slide and remove the same from said carrier, a platform at the base of said carrier and in line with said slides for supporting them, and a resilient guiding means for engaging the front surface of a slide for guiding the same on to said platform during the removal of the lowermost slide.

11. A slide carrier constructed to support and guide a plurality of slides vertically one above another, said carrier having an opening to permit light rays to pass through one of said slides for projecting the same, said carrier also being provided with an opening in the front thereof near its base to permit the lowermost slide to be withdrawn and having another opening permitting an operator's fingers to grasp the lowermost slide and remove the same from said carrier, and springs carried by the carrier and adapted to engage the front surface of a slide as it moves on to said platform, said springs being positioned in pairs so as to engage the slides near their edges and at two different heights above said platform.

12. A slide carrier consisting of a back plate having a channel formed therein for receiving slides one above another, and a front plate assembled with said back plate over said channel to hold and guide said slides, said back plate extending below said front plate forming an opening through which the lowermost slide may be withdrawn from said carrier, a platform at the base of said back plate for supporting said slides and being positioned in a plane passing through said slides, said carrier having an opening in the back plate at the base thereof to permit the thumb and finger of an operator to grasp the lowermost plate to oscillate the bottom thereof off from said platform.

13. A slide carrier consisting of a back plate having a channel formed therein to receive and guide projection slides, and a front plate assembled on said back plate and in front of said channel, said back plate being provided with side extensions to fix said plate to a lamp house, grooved pieces carried on the rear of said back plate for receiving condenser lenses, a platform carried at the base of said back plate for supporting said slides in the channel thereof, said back plate being provided with an opening midway between its side edges and near the base thereof to permit the lowermost slide to be grasped and oscillated from said platform to remove said slide from said carrier, and spring means carried by said front plate for engaging a slide as it drops to said platform thereby guiding the plate on to said platform.

EDWIN S. PORTER.